May 13, 1952     T. B. HAWKES     2,596,772
BAR GRIPPER MEANS FOR STRETCHING PRESSES
Filed April 25, 1946     2 SHEETS—SHEET 2
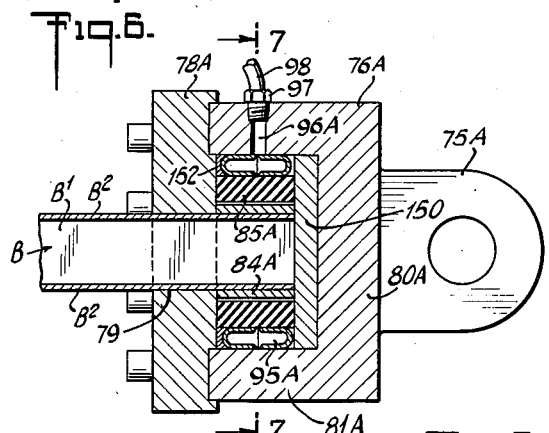
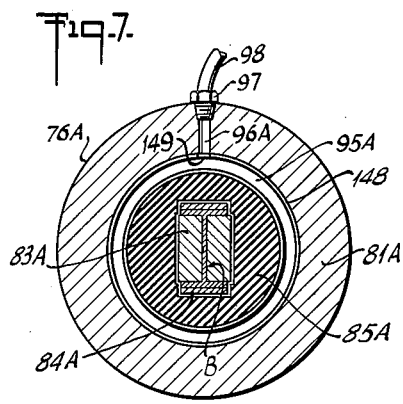
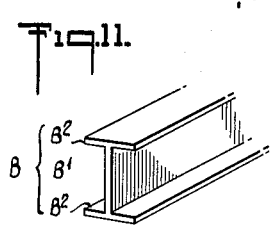
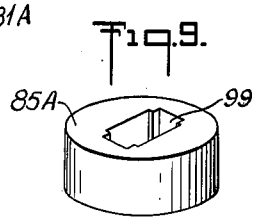
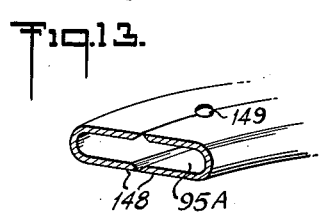
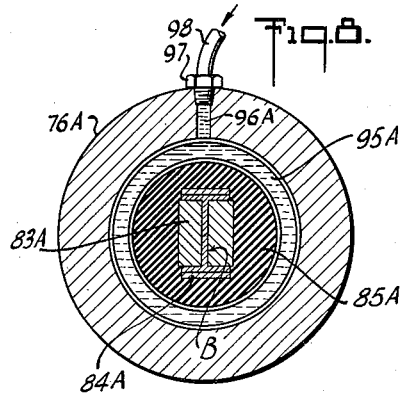
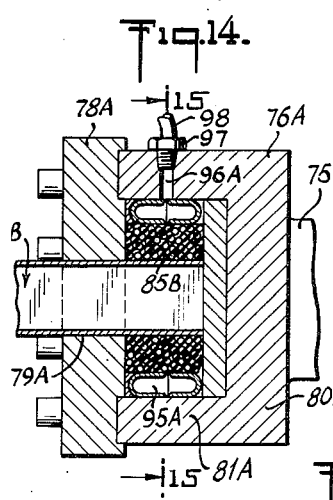
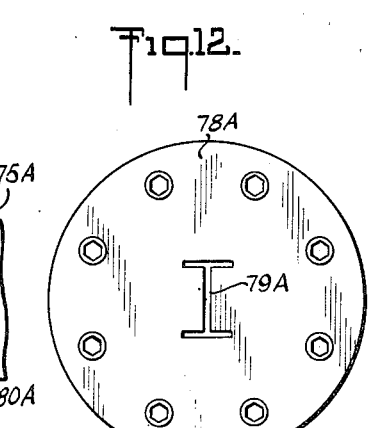
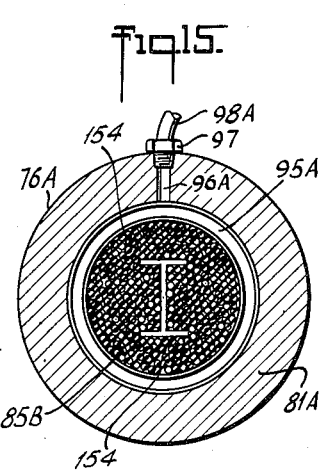
INVENTOR:
T. B. HAWKES.
BY Morrison, Kennedy
& Campbell,
ATTORNEYS.

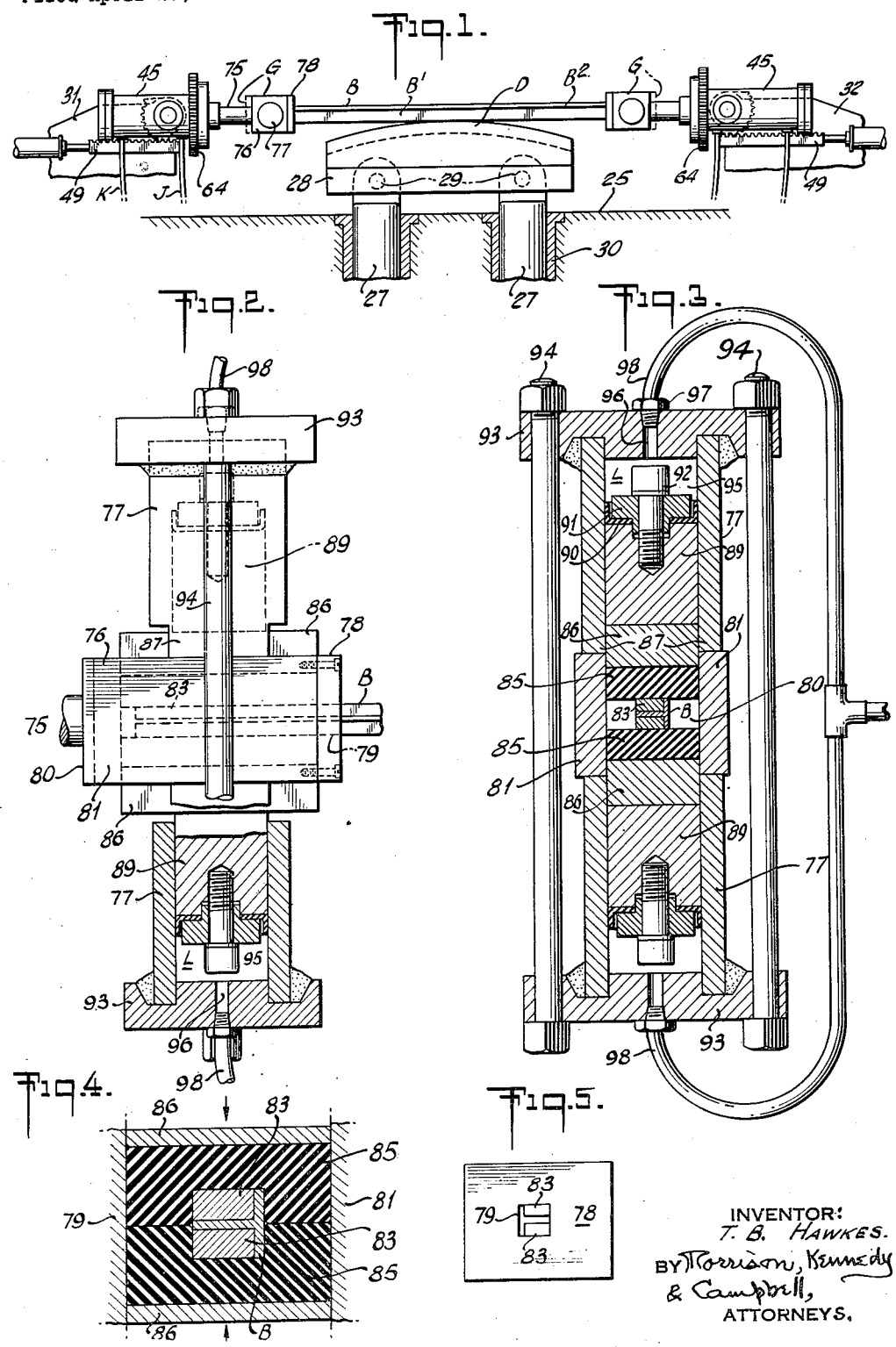

Patented May 13, 1952

2,596,772

UNITED STATES PATENT OFFICE 2,596,772

BAR GRIPPER MEANS FOR STRETCHING PRESSES

Thomas Blair Hawkes, Champlain, N. Y., assignor of one-half to The Sheridan Iron Works and one-half to T. W. & C. B. Sheridan Company, corporations of New York Application April 25, 1946, Serial No. 664,925

8 Claims. (Cl. 24—243)

This invention relates to the subject of stretching of bars, especially metal bars; with special reference to a gripper means or device adapted to grip and hold each end of the bar to be stretched, for example in a power apparatus or press for effecting stretch-shaping of such workpieces or bars, that is, the curving of the same about a suitable die or form while applying stretching pull to the work.

This application is a continuation in part of the present application of Hawkes, Serial No. 473,943, filed January 29, 1943, now Patent No. 2,431,173 for the Stretch-Shaping of Bars, Sheets and the Like; and containing additional matters of disclosure. Said Patent No. 2,431,173 granted November 18, 1947 thereon may be referred to for ascertaining various general features of structure and operation not herein fully disclosed, and as well details of arrangement, construction and mode of action not requisite herein for a disclosure of the subject matter of this invention.

A general object of the present invention is to afford a construction of gripper, or bar gripping device, of high efficiency and reliability for the holding of one end, or preferably both ends, of the workpiece or bar to be stretch-shaped or otherwise stretched. A further object is to afford such a gripper device which is simple and rugged in structure, smooth in action, and gives a powerful gripping and secure holding of each bar end during the stretching operations. Another object is to afford such a gripper device which, notwithstanding its bodily displacements during stretching actions, is readily maintained in connection with power means through which the closing of the gripper upon the work is brought about and maintained until the final release. More especially the invention has for a particular object the affording of effective hydraulic operation of the closing and opening of a work-bar gripper for the purposes of the recited stretching operations thereon. Further objects and advantages of the invention will be explained in the following description of illustrative embodiments thereof; and to the attainment of such objects and advantages the invention consists in the novel gripper device and the novel features of combination, arrangement, construction and detail herein illustrated or described.

In the accompanying drawings, Fig. 1 is a more or less diagrammatic front elevational view of a stretching, or stretch-shaping, machine or press, and containing gripper devices embodying the present invention.

Fig. 2 is a top side view partly in central section of an effective hydraulically operable gripper device, such as that indicated in Fig. 1, embodying the principles of the present invention.

Fig. 3 is a complete sectional view of the gripper device taken centrally at right angles to Fig. 2, in its position before the bar has been gripped.

Fig. 4, in sectional view similar to Fig. 3, shows the central or gripping portion on an enlarged scale and with the gripping parts in gripping position.

Fig. 5 is a detached left elevational view of the interior side of the interchangeable cover wall or plate, upon a reduced scale.

Fig. 6, in central longitudinal vertical section, shows a modified form of gripper device embodying the same basic principles as disclosed in Figs. 1 to 5, and illustratively designed for the stretching of I-beams. Fig. 7 is a transverse vertical sectional view taken on the section line 7—7 of Fig. 6. In Figs. 6 and 7 the pressure is slack and the bar not gripped. Fig. 8 is like Fig. 7, but under gripping pressure. Fig. 9 shows in detached perspective the rubbery mass of Figs. 6 to 8 in an annular form with shaped central recess; while Fig. 10 is similar but showing a circular recess.

Fig. 11 shows in end elevation an illustrative form of I-beam adapted to be gripped by the device of Figs. 6 to 13 or that of Figs. 14 to 16. Fig. 12 is a lefthand elevation of the removable cover plate of the gripper device of Fig. 6 or 14.

Fig. 13 is a detail view in sectional perspective showing the construction of an illustrative flexible, expansible pressure chamber as embodied in Figs. 6, 7 and others.

Fig. 14 is a central longitudinal sectional view like that of Fig. 6 but showing another modification constituting a third embodiment of the invention. Fig. 15 is a transverse sectional view like that of Fig. 7 taken on the section line 15—15 of Fig. 14. Fig. 16 is an enlarged view of the structure of the rubbery mass of Figs. 14 and 15.

In Figs. 1 to 5 the workpiece or bar, as a convenient example, is considered as a T-bar, with single flange and single central web, as shown; while in Figs. 6 to 15 the bar is considered as an I-bar or beam, constituting another example, with web and two flanges, although naturally many varieties of extruded or similar bar shapes may be gripped and stretched by the use of bar gripper devices constructed on the principles of the present invention.

The general parts of the press or stretching machine require but little description, constituting an illustrative use of the gripper device hereof.

The blank or workpiece B may be a bar of an extruded or other shape; and for example it may have a web portion B' and a flange B², combined as a T-bar, or it may have two such flanges rendering it an I-bar; or it may be an angle bar, a channel, or other shape. Fig. 1 shows a T-bar B being operated upon, and in this embodiment, following the parent case, the stretching is coordinated with bending or shaping, by means of a die D, in the nature of a curved pattern, adapted to be lifted to cause curvature of the blank while being stretched around the die. Above the general base 25 extend die rams 27, in the nature of plungers, carrying at their top ends a saddle or rising support 28 upon which interchangeable dies D may be mounted; there being shown pivots 29 between the rams and saddle in case rocking movements of the die are desired. The rams 27 are mounted for vertical sliding within cylinders 30, operable hydraulically from below. For stretching without curving of bars the die and operating means may be allowed to remain idle, or wholly omitted.

Upon the general base are suitably mounted an opposite pair of carriages for the gripper mechanism, there being shown a lefthand carriage 31 and a righthand carriage 32, which may be slidably rectractible upon the base and each carrying the mountings for one of the two grippers G, G.

One of the gripper mounting means comprises a tiltable head 45, trunnioned upon each of the carriages 31 and 32; and each head is shown as a hydraulic cylinder containing a piston operable through its rod 75 to retract and return the gripper, pipes j and k being indicated for supplying pressure liquid to and from the opposite ends of the cylinder 45 to effect such operations. Suitable means 49, including a rack, may be embodied to tilt the head 45 upwardly and downwardly when the bar is to be curved, and other means 64 including a turret may be embodied to rock the gripper when desired about its axis of longitudinal movement on the carriage.

The gripper G illustrated in Figs. 2 to 5 has a stem 75 which preferably also is the piston rod or connector part by which the gripper is mounted upon the head or hydraulic cylinder 45. The gripper is hollow, having an outer box or housing 76 containing ample space for the interior gripping and operating elements. The bar B intrudes axially within the housing or box and is surrounded by rubbery or resiliently flowable gripping means operated by surrounding means arranged to cause inward pressure to deform the rubbery elements or blocks and distribute the resulting pressure directly or indirectly to the bar. In this embodiment the surrounding means comprises a plurality of fixed hydraulic instruments or cylinders 77 and contained movable elements; two of such cylinders being illustratively shown, radially arranged around the housing and able to develope and apply the inward thrusting forces to deform the intermediate mass of plastic material or rubber and thereby apply holding grip to the intruding bar end, as will be more fully described.

The gripper G has its box or enclosure 76 surrounding its gripper chamber. The box proximal wall 78, that is, nearest the center of the press, facing the die D, has an open aperture 79 to receive with snug fit the end of the bar to be gripped and stretched, its distal wall 80 being united with the gripper stem 75, these parts and the box side walls 81 being shown in Figs. 1 to 5. Preferably the proximal housing wall 78 is removable, by releasing its attaching bolts, and interchangeable for others with openings 79 to receive bars of other shapes; being thus a detachable cover wall or plate.

The gripping means within box 76 and adjacent thereto comprises resilient opposite squeeze members or rubbery blocks 85 acting upon the workpiece or bar, preferably through interposed rigid jaw members 83; and there is shown means in the form of rigid plungers 86 to compress the squeeze members when operated by pistons working in cylinders under hydraulic actuation as will be described. The parts are shown relaxed and the gripper released in Figs. 2 and 3 but are gripping the work, a T-bar, in Fig. 4.

In the use of the gripper so described the blank or bar B to be shaped is manually inserted endwise through the aperture 79 and its end thus extended into and across the interior of the gripper box, where it is gripped and held. It is preferable in some cases to provide rigid jaw blocks, such as blocks 83, between which certain portions such as the web of the blank may be directly gripped, these blocks being of sectional shape to occupy and fill out the section of the blank thereby eliminating deep recesses and affording for example a quadrangle. The block inserts 83 may be surfaced or cross-scored like a file to give a stronger grip on the bar.

To avoid having the jaw blocks 83 initially loose in the box, or attached to the rubbery squeeze blocks, they are preferably suitably mounted in a position to be ready for the gripping action, and for convenience this is herein done by attaching or forming said jaw blocks upon the inner side of the apertured wall or plate 78, as seen in Fig. 5, and the mounting may be either loose or fast, in the latter case the two blocks being capable of deflection for the gripping action. When these parts are so assembled and the blank inserted, the blank is subject to the gripping pressure of the roughened jaw blocks 83 bearing on the blank web, while the outer sides of the bar flanges are exposed, as are the edges of its web and flanges, these parts thus being in readiness to receive high clamping pressure adapted to prevent the bar slipping out of its gripped position.

The active gripping element of the disclosed gripper consists of the rubbery or similarly yieldable squeeze blocks 85, surrounding the work piece and surrounded by the pressure producing means which deforms the rubbery mass to cause gripping pressure. These yieldable or flowable rubber blocks are located with the jaw blocks and blank centrally inside or between them, and are composed preferably of plastic rubber or the like, so that normally they retain their shape as seen in Fig. 3 until deformed for gripping purposes. Initially, when the blank is first inserted, there may be empty spaces at both lateral sides of the bar and jaw blocks, as shown; or the squeeze blocks might be initially shaped to occupy partly or wholly such spaces, as disclosed in Figs. 7 and 15.

Beyond or surrounding the opposite rubbery squeeze means or blocks 85 are shown in Figs. 2 to 4 a pair of rigid or metal pressure blocks 86, having a tight sliding fit in the otherwise open top and bottom of the gripper box, thereby to act as compression plungers giving inward thrust upon the squeeze members 85. The walls of the opposite hydraulic cylinders 77 extend inwardly toward the gripper box walls, with cutaway extensions 87 between which the opposite compressing blocks 86, 86 may slide toward and from each other. Beyond each of the two plunger blocks, and occupying the full section of each cylinder 77, is a piston 89 working therein and adapted to thrust the adjacent pressure block toward the center or gripping position of the device. For preventing leakage of hydraulic liquid, the outer end of each piston is shown provided with a packing cup 90 upon which bears a washer 91 attached by screw 92 to the piston.

The described assembly of a plurality of surrounding cylinders, with gripper box and chamber between them, and various interior parts, is completed as a unitary device by the provision of end pieces or head walls 93 into which the outer ends of the respective cylinders are set, and which end walls 93 have extensions or lugs to receive longitudinal tie-bolts 94 adapted to unify rigidly the entire gripper device. The various fixed parts or walls may be suitably held together as by means of the clamping pressure of the end pieces, although the perforated wall 78 is preferably removable as stated.

The gripper device is completed by the provision of power thrusting or piston operating means. There is shown a liquid chamber 95 between each piston and the adjacent end wall 93, with an entrance passage or pressure port 96 through such wall, having a nipple connection 97 to a supply pipe 98, these being filled with hydraulic liquid L supplied from any suitable pump or source of pressure, with valve control. Preferably the two pipes 98 are interconnected with each other and with a common pressure source, as shown for example in Fig. 3, so that an equalizing pressure action converging upon the blank is produced. Thus, the pistons and the parts between them may be caused to deliver a high mechanical pressure upon the workpiece, the rubbery blocks 85 gripping the bar in part directly and in part through the jaws 83. Fig. 4 shows how the rubbery masses 85 are caused to flow and become molded about the workbar and jaw blocks under their heavy compression, giving intense and firm friction hold upon the bar, adapted to fulfill the purposes described. In order to permit the various necessary movements of the gripper during operation the liquid supplying pipe 98 should be a flexible connection or hose, such as a thick-walled rubber tube; and the control of the described hydraulic and gripping actions may be manual or under automatic timing.

The use of a plurality of the radial cylinders containing pressure means affords more complete distribution of pressure upon the rubbery mass 85, which transmits it to the bar. While the mass is shown in two sections and could be in many pieces stuffed into the gripping chamber, it is in effect an annular mass, in its embracing or enclosing of the bar, and becomes a quadrilateral annulus when under deformation as in Fig. 4. The spaces 95 constitute a pressure means or plural chamber, each one having its inwardly yielding wall or piston 89 to thrust through plunger 86 upon the plastic mass, the outer and lateral walls being stationary.

The bar gripper hereinabove described and shown in Figs. 1 to 5 may be summarized as follows as to its principles of structure and operation, which principles are embodied also in the alternative grippers of the remaining figures of the drawings. The gripper as a whole has a walled enclosure, which may be considered as a closed box, containing a substantial hollow space serving as a gripping chamber and accommodating the end of the bar, that is, a short length thereof, and a bar gripping means. The proximal wall of the enclosure, being the wall nearest to the middle portion of the bar, is apertured for the close-fitting longitudinal sliding entry of the bar into a central gripping position within the gripping chamber. The interior gripping means comprises a mass of rubbery or other suitable elastic material disposed within the gripping chamber in a manner to embrace or to surround the bar position, and deformable under the stress of pressure to exert a gripping thrust, direct or indirect, upon the bar. In combination with said embracing mass is a pressure means disposed outwards of the mass and movable centripetally to apply an inwardly directed forcible deforming pressure to the mass. By this arrangement, when the pressure means is operated it causes the rubbery mass to be deformed to exert centripetal thrust upon the bar end to grip and hold it against longitudinal displacement until released.

The embodiment of Figs. 6 to 13 operates upon the principles thus described, and certain of the parts correspond approximately with certain of those already described. Instead of the stem 75 of the first form of the invention, the second form has a mounting lug or ear 75A formed or attached upon the gripper box or housing 76A. At its proximal side the housing is closed by an apertured inner wall or cover plate 78A, readily detachable and interchangeable by removing the eight bolts which hold it in place.

The bar B, being an I-beam, has its web B' and flanges $B^2,B^2$, and to accommodate snugly the entry of such a bar the cover plate 78A is formed with the opening 79A, of the same I-shape, with sufficient clearance to permit the sliding entry of the bar to its central position within the main or gripping chamber of the box. The distal or outer box wall 80A carries the mounting lug 75A. In this embodiment the enclosure or housing is completed by the cylindrical wall 81A, preferably integral with the wall 80A and receiving the attaching bolts of the removable cover wall.

When the bar or blank is of a shape with deep recesses rendering it difficult for the rubbery mass to flow therein and contact all parts of the bar, as is sometimes the case with an I-beam, it may be desirable to supplement the bar by applying rigid blocks, such as steel jaws 83A at suitable points to afford substantial convexity for the gripping engagement. Thus Fig. 7 shows these blocks, of roughened steel, filling the concave spaces within the bar outline; and they may be supplemented with analogous blocks 84A located against the bar flanges. This feature however is optional, since the jaw blocks need not always be interposed, and the gripping contact of the rubbery mass may be directly upon all parts of the bar, as seen in Figs. 14 and 15.

In these second and third embodiments the rubbery or elastic material is shown in the form of a substantially annular mass 85A, which thus not merely embraces the workpiece but surrounds it, for gripping action upon all exposed sides thereof, when placed under deforming stress.

For producing the centripetal stress upon the rubbery mass a pressure means is provided, disposed outwards of the mass and movable inwardly to create the deforming and gripping pressure. Instead of the movable rigid plungers 86 of the first form, operated from the exterior, the second embodiment employs a hydraulic pressure chamber 95A, in the nature of a hollow diaphragm, composed of flexible material, with its inner side bearing against the annular rubbery mass and its outer side backed up by the cylinder wall 81A, the chamber being of the form of a substantially complete circle, that is, annular, so as to bear inwardly and convergingly toward the general axis or center around the entire periphery of the rubbery mass. To cause the flexible pressure chamber to expand inwardly its outer side is formed with an opening in alinement with a passage or port 96A extending through the cylindrical wall to an exterior point, whereat it carries a threaded nipple 97 coupled with a flexible tube or hose 98 leading from any valved source of hydraulic pressure. The tube 98, port 96A and chamber 95A are filled with an oil or other suitable hydraulic liquid L, and when pressure from the source is applied, the swelling of the pressure chamber causes the centripetal thrust of the rubbery mass either directly upon the bar to be gripped or upon the metallic gripper blocks or jaws 83A which in turn press upon and hold the bar against displacement. The pressure means or chamber 95A, being a normally collapsed but inflatable annular bag or tube of rubber, fabric or the like, delivers an equalized inward pressure around all sides of the bar.

The flexible pressure chamber may act somewhat as a bellows, expanding with the introduction of the hydraulic fluid, and for the following reasons its actual expansion movement need not be excessive. In Figs. 6 and 7 the pressure chamber 95A is shown as being slack or deflated, so that the rubbery mass is in its normal position, and the bar B can enter loosely. In this embodiment the central recess in the rubber mass is preshaped so as to conform substantially with the outline of the metal parts to be acted upon, in this case the bar B with the steel jaws applied thereto. By reason of this arrangement a quite small pressure movement affords the necessary grip. Fig. 8 differs from Fig. 7 in that the pressure chamber or bellows is expanded inwardly, the rubbery mass being thus contracted and gripping the central parts. The detached view in Fig. 9 shows the rubber mass before insertion into the gripper, indicating its shaped central recess 99 corresponding with Fig. 7. By having a sufficiently greater degree of expansion of the pressure chamber the rubber mass may be in the form of a true circular annulus for example as shown in Fig. 10, with round recess 100.

A simple manner of constructing the pressure chamber 95A is illustratively shown, consisting in the preparing of complementary chamber wall portions 148, each of U-shape as more clearly shown in Fig. 13. Each of the wall members may consist of a flexible packing material, of well known kind, and they may be united at their edges to afford a substantially closed flat tubular chamber, or the two parts may be unattached when the surrounding parts of the gripper device are liquid-tight. Naturally, a flexible tubular pressure chamber or bag may be formed in any well known manner, and may be wholly closed excepting for its small port 149, as shown, leading from and to the port or passage 96A in the housing wall 81A.

The flexible pressure chamber 95A may be placed and mounted within the gripper chamber in any suitable way, for example by means of abutments or seats, as follows. Within the gripping chamber, against the wall 80A is placed an abutment or seat 150, which may be in the form of a lining disc, or may be a ring, with its rim, at its inner side, formed with a shallow concavity or gutter against which one end of the pressure chamber rests, while at the other end, in contact with the removable cover wall 78A is a complementary guttered ring 152. The outer side of the flexible chamber bears against the gripper chamber cylindrical wall 81A, while the inner side of the pressure chamber bears against the rubbery mass 85A. When the hydraulic pressure is applied to the pressure chamber it expands inwardly, forcibly contacting the rubbery mass at the periphery of the latter thereby causing the inner portion of the mass to exert gripping pressure upon the workpiece as already described, around its periphery.

The third embodiment of the invention, shown in Figs. 14 and 15, differs mainly in two respects from the second embodiment. In the first place, the supplemental holding jaws 83A, 84A are omitted, the rubbery mass 85B being arranged to make direct contact with the bar to be stretched. In the second place, the rubbery mass is of a special advantageous form, the rubbery or plastic material having embedded in it, and substantially filling it, a multiplicity of small shot or steel balls 154, which may be in contact with each other within the mass but due to the elastic nature of the mass are capable of relative movement, while locked in the embedding material. This structure has advantages in stabilizing the annular rubbery mass, and more particularly it provides, at the inner or gripping surface thereof, a highly efficient gripping surface, whereat the exposed balls may contact substantially directly against the surface of the bar to be held, with the rubbery matrix material also contacting the bar between the contact points of the balls. Such an elastic gripping mass is found to be adequately deformable for the purpose and to provide a high degree of holding action preventing longitudinal displacement of the bar within the gripper. See Fig. 16.

When the metal grip pieces 83A or 84A are used they press directly upon and hold the bar, the rubbery mass applying the pressure; in that case the rubber need not flow into deep recesses. The rubber mass, whether or not shot-filled, could be preformed or cut for its recess to fit loosely the bar and the adjacent grip pieces, or the bar alone, as shown. A satisfactory way to preconstruct such a mass is as follows. A dummy chamber or mold is formed corresponding to the gripper chamber in size and shape. It is set with its open side upward and a dummy piece, insert or core corresponding to the bar, with or without the grip blocks, is correctly positioned therein and held by a clip, bracket or otherwise. The vulcanizable rubber material is placed in the mold to the proper depth, preferably preceded by the steel shot when used. The mold is closed and pressure and heat applied in any way known to the rubber art, causing the embedding of the shot, and then, in due time, the molded mass becomes cured or vulcanized into the resilient product or annular mass desired. In the case of other elastic plastics e. g. thermosettable material heat is applied to the molded mass in accordance with approved practice. The dummy insert or core is preferably slightly larger than the desired shaped recess so as to provide clearance for insertion of each bar into gripping position. When the recess is to be substantially larger, for example as in Fig. 10, to accommodate various bar shapes, a circular core is used in the mold. When removed from the mold the mass can be positioned within the gripper chamber and the ring 152 and cover 78A applied, completing the gripper for gripping and stretching purposes.

Any approved way to mold and vulcanize the rubbery masses 85 or 85A or 85B can be used. Moldable crude rubber may be used, softening and flowing to embed the shot during the heating under pressure when curing. Or the plastic material and shot could be premixed, before molding.

The annular chamber 95A can be variously constructed; the use of two separate annular U-packing strips being convenient. The inner and outer lips of each part press respectively against the rubbery mass 84A or 84B and the chamber peripheral wall 81A, and these contacts tighten with increase of pressure, sufficiently to prevent impairing leakage. The opposed inner lips could be cemented to the rubbery mass to improve the fit at this point. For building up the annular chamber out of two rings of packing a recently introduced form of packing strip is of advantage in which the body portion at the bend is designed of squared form, so as to fit a square seat in the gripper enclosure, dispensing with the curved gutters on the bounding parts 150 and 152; this U-packing material being composed of stretchable rubber, to further advantage. In any case the annular chamber, being confined outwardly and at each end is compelled to expand and thrust toward the center when the hydraulic medium is forcibly introduced.

The disclosures of Figs. 6 to 15 may be summed up as follows. In these forms the gripper device has a walled housing or enclosure 76A with peripheral and end walls and containing an annular gripping chamber one end wall of which is apertured for the longitudinal entry of the bar end into its axial gripping position within the chamber. The interior gripping means comprises a ring or annular mass 85A of rubbery material disposed to embrace surroundingly the bar position and deformable under pressure to exert gripping thrust upon the bar, with a pressure means surrounding said ring or annulus and operable centripetally to apply an inwardly directed forcible deforming pressure to the ring. Thereby when said pressure means is operated the rubbery ring is caused to exert centripetal thrust upon the bar to grip and hold it against longitudinal displacement in the gripper. Preferably the pressure means is annular, extending around the entire circumference and operative to constrict the rubbery gripping ring; and is shown as a hydraulic chamber 95A, confined outwardly and longitudinally by the housing walls, thus necessarily expanding inwardly when hydraulic pressure is admitted, after the bar is in axial position, thus causing equalized centripetal pressure around the entire gripping ring and complete gripping and holding by the constricted ring of the bar end.

What is claimed is:

1. For a bar stretching machine a gripper device comprising a gripping annulus composed of a matrix of rubbery material elastically deformable inwardly for substantially direct gripping action upon the bar; and embedded in said matrix numerous hard shot relatively movable with the deforming play of the matrix material and providing at the gripping surface an effective gripping action, preventing relative sliding of the bar with respect to the gripper device.

2. For a bar stretching machine a gripper device comprising peripheral and end walls enclosing a central gripping chamber containing an annulus composed of a rubbery mass providing a matrix elastically deformable inwardly for gripping action on the bar end, said end wall having a hole for close-fitting entry of the bar end centrally into the chamber; and means disposed outwards of the rubbery mass for applying inward pressure to deform the mass and cause it to grip the bar for holding it against displacement; said rubbery mass having embedded in it numerous small hard separate particles relatively movable with the deforming play of the matrix material and adapted to provide an effective gripping action between the gripper device and the bar end.

3. For a bar stretching machine a gripper device comprising peripheral and end walls enclosing a central gripping chamber containing a generally annular rubbery mass providing an elastically deformable bar end gripping action, and said end wall having a hole for close-fitting entry of the bar end centrally into the chamber; and means disposed outwards of the rubbery mass for applying inward constricting pressure to deform the mass and cause it to press upon and grip the bar end for holding it against displacement; said rubbery mass having embedded in it a multiplicity of small hard shot-like metallic bodies relatively movable within the rubbery mass and adapted to provide an effective gripping action between the gripper device and the bar end; some of which multiplicity of hard bodies lying at the surface of the rubbery mass and exposed to substantial contact against the bar end thereby to impress the bar and enhance the gripping effect thereon.

4. For a machine for stretching metal bars, a bar gripper device having a walled enclosure formed with a central gripping chamber accommodating an enclosed means for gripping the end of the bar inserted therein, the proximal wall of the enclosure having an entrance hole for the close-fitting longitudinal sliding entry of the bar end into a centrally projecting position within the gripping chamber; the enclosed bar gripping means comprising a mass of rubbery material disposed to embrace surroundingly the central portion of the gripping chamber and deformable under exterior pressure to exert gripping thrust by the rubbery mass upon the bar, and means for applying pressure disposed outwards of said mass and movable in the chamber to apply an inwardly directed forcible deforming pressure to the mass; so that when said pressure means is operated the rubbery mass is deformed to exert inward thrust upon the bar thereby to grip and hold it firmly against longitudinal sliding displacement in the gripper device; the rubbery mass being impregnated with a multiplicity of small hard shot including numerous ones exposed to substantial contact against the bar whereby the pressure acts through such shot to impress the bar and make rigid the connection between the gripper device and the bar.

5. A bar gripper device as in claim 4 and wherein the rubbery shot-filled mass is of annular form fitting the surrounding chamber wall and adapted to surround and grip the centrally projecting end of the bar to be stretched in a tight manner to prevent relative movement between the walled enclosure and the bar end.

6. For use in a metal bar stretching machine, a bar gripper device having a walled housing with peripheral and end walls and containing a gripping chamber accommodating an enclosed means for gripping the lateral sides of the end portion of a bar slidingly inserted through an end wall into its axial gripping position within the gripping chamber; the enclosed bar gripping means comprising an annulus of rubbery material disposed to embrace surroundingly the position to be occupied by the bar end and deformable under pressure to exert inward gripping thrust upon the bar end, pressure means surrounding said annulus and consisting of a circumferential pressure chamber which is expansible inwardly but otherwise confined, and the walled housing having an inlet passage leading into said pressure chamber for conducting liquid from a pressure source to the pressure chamber; whereby when said pressure means is operated the rubbery annulus is deformed around its periphery and thus caused to exert equalized centripetal thrust upon the bar causing the latter to grip and hold the bar against sliding displacement in the gripper; the said rubbery annulus having embedded therein a large number of hard metal shot of which many are exposed to substantial contact at the annulus surface whereby when gripping pressure is applied to the rubbery mass it acts through the surface shot to enhance the effectiveness of the bar gripping action.

7. For a machine for stretching metal bars, a bar gripper device having a walled enclosure formed with central gripping chamber accommodating an enclosed means for gripping the end of the bar inserted therein, the proximal wall of the enclosure having an entrance hole for the close-fitting longitudinal sliding entry of the bar end into a centrally projecting position within the gripping chamber; the enclosed bar gripping means comprising elastically compressible material disposed to embrace the central portion of the gripping chamber and deformable under exterior pressure to exert gripping thrust by the compressible material upon the bar, and means for applying pressure disposed outwards of said material and movable within the chamber to apply such inwardly directed forcible deforming pressure; so that when said pressure means is operated the compressible material is deformed to exert inward thrust upon the bar thereby to grip and hold it firmly against sliding displacement in the gripper device; and said elastically compressible material being in the form of a shaped mass which has embedded, at least in the contact surfaces thereof, numerous small hard shot adapted to make contact with the bar end whereby the pressure acts through the material and the shot to afford rigid gripping of the bar end within the enclosure of the gripper device.

8. For a metal bar stretching or shaping machine, a bar gripper device having a walled housing containing a gripping chamber accommodating an enclosed means for receiving through a hole in an end wall, and for gripping the lateral sides of the end portion of the bar in an axial gripping position within the gripping chamber; the enclosed bar gripping means comprising an annular mass or ring of rubbery material disposed to embrace surroundingly the central portion of the chamber, and said gripping means being deformable under pressure to exert gripping thrust inwardly upon the bar, and means for applying pressure surrounding said rubbery ring and operable centripetally in the chamber to apply an inwardly directed forcible deforming pressure to the ring, thereby to cause the ring to exert centripetal thrust to grip directly and hold the bar against longitudinal sliding or other displacement in the gripper; said ring being composed of a matrix of elastically deformable plastic material having embedded therein a multiplicity of small, hard metal shot giving stability to the mass and improving the gripping action thereof.

THOMAS BLAIR HAWKES.

REFERENCES CITED

The following references are of record in the file of this patent:

UNITED STATES PATENTS

| Number | Name | Date |
|---|---|---|
| 1,075,715 | Ludwick | Oct. 14, 1913 |
| 1,236,453 | Lavoie | Aug. 14, 1917 |
| 1,548,730 | Mirfield | Aug. 4, 1925 |
| 1,772,210 | Dale | Aug. 5, 1930 |
| 1,835,632 | Buhrke | Dec. 8, 1931 |
| 2,288,158 | Ellinwood | Jan. 30, 1942 |
| 2,308,403 | Terry | Jan. 12, 1943 |
| 2,338,256 | Philippsen | Jan. 4, 1944 |
| 2,382,958 | Burgoine | Aug. 21, 1945 |
| 2,394,785 | Kindervater | Feb. 12, 1946 |
| 2,442,495 | Hull | June 1, 1948 |

FOREIGN PATENTS

| Number | Country | Date |
|---|---|---|
| 1,471 | Great Britain | Mar. 27, 1882 |
| 2,421 | Great Britain | Feb. 14, 1890 |
| 224,007 | Switzerland | Jan. 18, 1943 |